(12) United States Patent
Meyer et al.

(10) Patent No.: US 6,805,521 B2
(45) Date of Patent: Oct. 19, 2004

(54) CHUCK WITH ADDITIONAL CUTTING ELEMENTS

(75) Inventors: Ernst Meyer, Lauf (DE); Klaus Sperber, Plech (DE)

(73) Assignee: EMUGE-Werk Richard Glimpel GmbH & Co. KG Fabrik für Päzisionswerkzeuge, Lauf (DE)

( * ) Notice: Subject to any disclaimer, the term of this patent is extended or adjusted under 35 U.S.C. 154(b) by 94 days.

(21) Appl. No.: 10/106,961

(22) Filed: Mar. 26, 2002

(65) Prior Publication Data

US 2002/0141840 A1 Oct. 3, 2002

(30) Foreign Application Priority Data

Mar. 27, 2001 (DE) .......................................... 101 15 016

(51) Int. Cl.⁷ .................. B23B 51/00; B23B 39/00; B23D 77/00
(52) U.S. Cl. ................... 408/224; 408/118; 408/231; 408/713
(58) Field of Search ................. 408/117, 118, 408/199, 223, 224, 225, 227, 230, 231, 713

(56) References Cited

U.S. PATENT DOCUMENTS

| | | | | |
|---|---|---|---|---|
| 1,281,627 A | * | 10/1918 | Misener et al. .............. 408/206 |
| 2,340,941 A | * | 2/1944 | Dietz ........................... 408/191 |
| 2,358,608 A | * | 9/1944 | Turner ......................... 408/153 |
| 2,826,104 A | | 3/1958 | Morin | |
| 3,266,344 A | * | 8/1966 | Supernor .................... 408/190 |
| 3,504,577 A | * | 4/1970 | Parenti ....................... 408/199 |
| 4,340,327 A | * | 7/1982 | Martins ....................... 408/59 |
| 4,353,670 A | | 10/1982 | Jorgensen | |
| 4,852,196 A | * | 8/1989 | Martin ......................... 7/165 |
| 5,265,988 A | | 11/1993 | Schmigalla et al. | |
| 5,288,184 A | * | 2/1994 | Heule ......................... 408/224 |
| 5,458,444 A | * | 10/1995 | Duncan ....................... 408/80 |

FOREIGN PATENT DOCUMENTS

| | | |
|---|---|---|
| DE | 9407197 | 8/1994 |
| DE | 9528824 | 2/1997 |
| DE | 9616165 | 3/1998 |
| EP | 0684099 | 11/1995 |
| GB | 0258692 | 9/1926 |
| JP | 5166576 | 9/1976 |
| JP | 6458409 | 3/1989 |
| JP | 0655320 | 3/1994 |

* cited by examiner

*Primary Examiner*—A. L. Wellington
*Assistant Examiner*—Brian D. Walsh
(74) *Attorney, Agent, or Firm*—Sidley Austin Brown & Wood, LLP

(57) ABSTRACT

A chuck for securing a working tool in a machine tool and including a one-piece, ring-shaped carrier member arranged outside of the end surface of the receiving end region of the chuck and parallel thereto and provided with cutting region having additional cutting elements distributed circumferentially around the receiving bore of the receiving end region and extending transverse to a plane defined by the ring-shaped carrier member and projecting away from the carrier member which secured by crews to the receiving end region of the chuck.

9 Claims, 1 Drawing Sheet

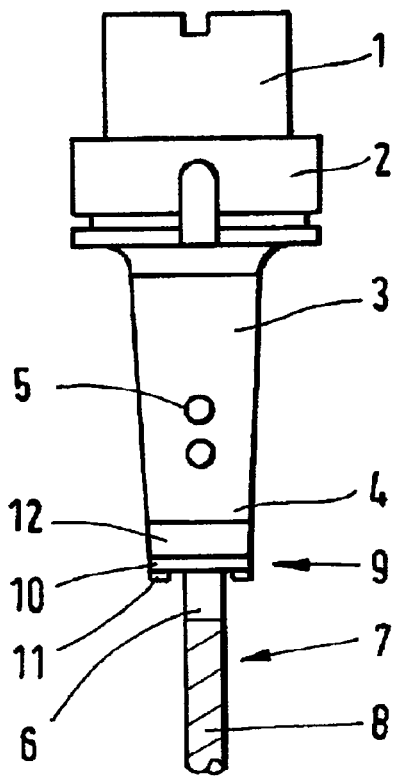
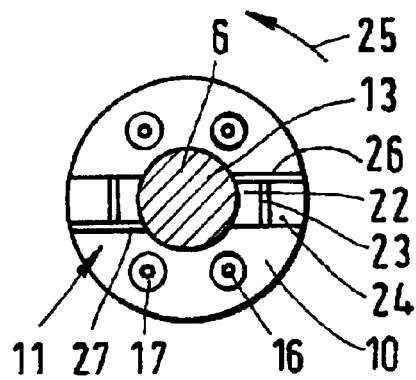
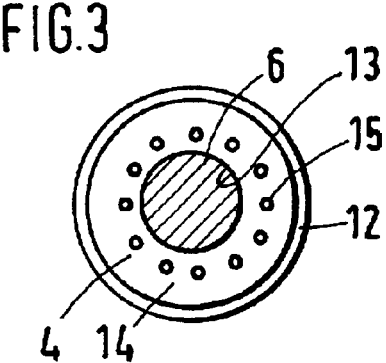
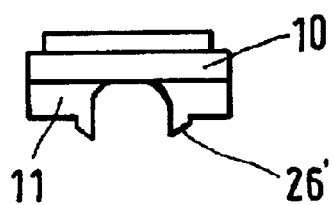
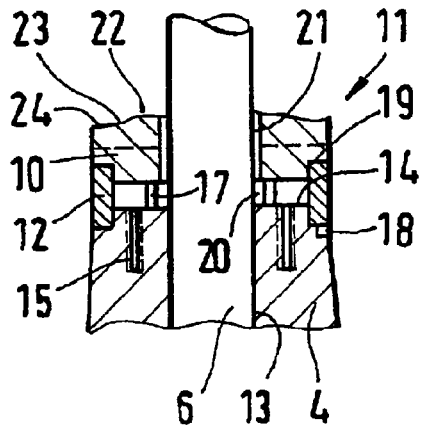
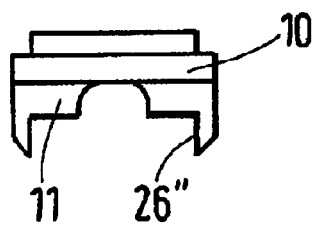

CHUCK WITH ADDITIONAL CUTTING ELEMENTS

BACKGROUND OF THE INVENTION

1. Field of the Invention

The present invention relates to a chuck for securing a working tool in a machine-tool and including a receiving end region having a front end surface, a bore extending from the end surface for receiving a shank of the working tool, and a plurality of threaded holes arranged around the receiving bore, a carrier member arranged outside of the end surface of the receiving end region and parallel thereto and provided with cutting regions having additional cutting elements distributed circumferentially around the receiving bore of the receiving end region, and a plurality of retaining screws extending through the openings formed in carrier member and screwed into respective thread holes formed in the receiving end region for attaching the carrier member to the end receiving region.

2. Description of the Prior Art

German Publication DE 195 28 824 A1 discloses a chuck with additional cutting elements in which the carrier member has several cutting regions each of which is formed by its own plate and each of the cutting region-forming separate plates is inserted in a respective pocket-shaped recess formed in the receiving end region and is retained there by a screw. Each of the plate extends parallel to the central axis of the chuck. Each cutting region is defined by a plane of a respective plate. The cutting region-forming plates should be uniformly inserted in respective pocket-shaped recesses so that, on one hand, respective additional cutting elements can perform their function and, on the other hand, to insure a uniform distribution of the additional cutting elements over the circumference of the receiving end region. This particularly important as each plate is retained by a single retaining screw. The formation of separate pocket-shaped recesses specifically adapted to the plates significantly increases manufacturing costs, in particular, because the pocket-shaped recesses must be machined or must be subjected to electroerosion treatment.

Accordingly, an object of the present invention is to provide a chuck with additional cutting elements the cost of manufacturing of which is substantially reduced, with retaining at the same time a desired precision of the arrangement of the additional cutting elements.

SUMMARY OF THE INVENTION

This and other objects of the present invention, which will become apparent hereinafter, are achieved by providing a one-piece, ring-shaped carrier member arranged outside of the end surface of the receiving end region and parallel thereto and provided with cutting regions having additional cutting elements distributed circumferentially around the receiving bore of the receiving end region, with the cutting regions extending transverse to a plane defined by the ring-shaped carrier member and projecting away therefrom.

With the ring-shaped carrier member according to the present invention, only threaded holes must be formed in the receiving end region, which substantially reduces the cost connected with manufacturing of the chuck. Because the additional cutting elements are provided in a one-piece ring-shaped member, the circumferential distribution of the cutting elements is easily insured. Moreover, the precision of the arrangement of additional cutting elements is insured because they are secured in their position with several clamping screws. The present invention also improves and makes more precise the angular adjustment of the additional cutting elements relative to the tool. The present invention also insures a precise positioning of the profile of a workpiece, which is produced with the additional cutting elements, relative to a bore formed in the workpiece.

Further, the manufacturing of the ring-shaped carrier member is effected independently of the chuck itself The ring shape of the carrier member permits to avoid unbalance of the chuck provided with additional cutting elements.

The receiving end region of the chuck according to the present invention can be provided, e.g., with a sleeve insert forming a receiving bore. However, it is preferable and advantageous when the receiving region and the rest of the chuck are formed as a monoblock.

A chuck according to the present invention is designed with a receiving bore for holding a tool. However, the inventive chuck can be formed without taking into consideration the need for receiving a tool, only with additional cutting elements. However, the inventive chuck is primarily designed taking into consideration the need to properly arranged the additional cutting elements relative to the tool. The threaded holes, which are provided in the receiving end region do not adversely affect the rigidity of the receiving end region even when a large number of the threaded holes is formed. The circumferentially distributed additional cutting elements are arranged diametrically opposite each other. There can be provided, on the ring-shaped carrier member, right-hand cutting elements, left-hand cutting elements, or both right-had and left-hand cutting elements.

It is particularly preferable and advantageous when at least one of the cutting regions is formed of two functionally different additional cutting elements which extend at angle to each other or are offset relative to each other. This, per se known arrangement, in connection with the present invention, improves the precision of the positioning of the additional cutting elements.

According to the present invention, a cylindrical member can be fixedly secured on the ring-shaped carrier member. The cylindrical member is pushed on the receiving region and is secured thereto with radially extending retaining screws. It is particularly preferable and advantageous when the retaining screws extend axially with respect to the end surface of the receiving end region, and the threaded holes extend from the end surface of the receiving end region inward. With this arrangement, the ring-shaped carrier member itself serves as an abutment for the retaining screws. The retaining screws push the ring-shaped carrier member toward the end surface of the receiving end region.

It is further preferable and advantageous when the ring-shaped carrier member is spaced from the end surface of the receiving end region by a spacer an axial height of which corresponds to a distance by which the ring-shaped carrier member needs to be spaced from the end surface of the receiving end region, and which is supported at its opposite axial ends against the end surface of the receiving end region and against the ring-shaped carrier member, respectively. The spacer form, e.g., the screwed-on cylindrical member described previously. The spacer permits to adapt the axial position of the additional cutting elements to an axial position of the working tool. Thus, usually, a set of spacers having different length is provided together with the chuck, which permits to use a ring-shaped carrier member with predetermine additional cutting elements in combination with a plurality of different tools. In addition, the spacer improves centering of the ring-shaped carrier member with respect to the receiving end region.

The spacer can be formed, e.g., together with the ring-shaped carrier member, as a one-piece part the length or axial height of which changed by grinding the spacer down. However, it is preferable and advantageous to form the spacer as a separate, from the ring-shaped carrier member, part when the retaining screws extend axially. The spacer having a particular axial height or length is selected dependent on the desired axial position of the additional cutting elements.

It is particularly preferable and advantageous when the retaining screws have the same predetermined length and are associated with a plurality of spacers having different axial height. The threaded holes should be sufficiently deep to insure a complete screw-in even when the spacer has a very small axial height. There is no need to provide a separate set of retaining screws for each spacer having a different axial height.

It is particularly preferable and advantageous when wherein the threaded holes formed in the receiving end region, the openings formed in the ring-shaped carrier, and the retaining screws provide for securing of the ring-shaped carrier member in different angular positions with respect to the receiving end region by rotating the ring-shaped carrier member about the receiving bore. This permits to adjust the position of the ring-shaped carrier member relative to the inserted working tool during mounting, insuring an optimal positioning of the additional cutting elements and of the cutting elements of the working tool relative to each other. Thereby the position of the additional cutting element can be adapted to the position of the working tool, without a need to change the position of the working tool.

The opening in the ring-shaped carrier member can be formed as elongate bores extending in the circumferential direction, which permits to rotate the ring-shaped carrier member about the receiving bore in order to secure the ring-shaped carrier member in different angular positions. It particularly preferable and advantageous to form the openings in the ring-shaped carrier member as round bores, and the number of threaded holes differ from a number of the round bores. With the number of the threaded holes exceeding the number of round bores, the angular adjustment of the ring-shaped carrier member relative to the receiving bore is significantly facilitated.

It is particularly preferable and advantageous when the threaded holes are arranged in a form a closed ring-ended sling, with the number of the threaded holes exceeding the number of the round bores in several times by an integral multiplied. This permits to effect an angular adjustment of the ring-shaped carrier member in small angular steps, e.g. by 30°.

According to a particularly preferred and advantageous embodiment of the present invention, at least one of the cutting region has, at its side adjacent to the receiving bore, an additional cutting element extending in a longitudinal direction of the receiving bore in a spaced relationship thereto. The longitudinally extending cutting element permits to machine the outer profile of a projected element of work-piece in which a bore is formed.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

In the Drawings:

FIG. 1 shows a side view of a chuck with additional cutting means according to the present invention;

FIG. 2 shows a front view of the chuck shown in FIG. 1 at an increased scale;

FIG. 3 shows a view similar to that of FIG. 2 but without a ring-shaped carrier member;

FIG. 4 shows a cross-sectional of the additional cutting means according to FIG. 1 at an increased scale and pivoted, in the plane of the drawing, by 180° with respect to the view shown in FIG. 1;

FIG. 5 shows a side view of a first embodiment of the ring-shaped carrier member for the chuck shown in FIG. 1; and FIG. 6 shows a side view of a second embodiment of the ring-shaped carrier member for the chuck shown in FIG. 1

DETAILED DESCRIPTION OF THE PREFERRED EMBODIMENT

A chuck according to the present invention, which is shown in the drawings, has a connection region 1, a manipulation region 2, and a front receiving region 3 with a front end receiving region 4. In the front receiving region 3, there are provided clamping screws 5 for securing a shank 6 of a tool 6 in the chuck. The tool 7 is provided with cutting means 8. On the front end receiving region 4, there provided additional cutting means 9 that includes a ring-shaped carrier member 10 having two cutting regions 11 and separated from the front end receiving region 4 by a spacer 12.

As shown in FIGS. 2–3, the shank 6 of the tool 7 is inserted in a central bore 13 of the receiving region 3. The entrance opening of the central bore 13 coincides with an end surface 14 of the front end receiving region 4 that extends perpendicular to the longitudinal extent of the receiving bore 13.

In the front end receiving region 4, there is provided a plurality of threaded holes 15 extending from the end surface 14 and into the body of the front end receiving region 4. The threaded holes 15 are arranged about the receiving bore 13 in form of a ring-ended sling. The threaded holes 15 are associated with a smaller number of countersunk round bores 16 provided in the ring-shaped carrier member 10. The threaded holes 15 are arranged between the cutting regions 11. A retaining screw 17 extends through each of the round bore 16, with the screw head being located in the countersunk portion of the bore 16. The retaining screw 17 is screwed into a threaded hole 15. There are generally provided four round bores 16 for four retaining screws 17, and twelve threaded holes 15. FIG. 4 shows the arrangement of the shank 6 of the tool 7 in the receiving bore 13 of the receiving region 3. The front end receiving region 4 has, at its outer edge and at the end surface 14, a countersunk recess 18 into which the spacer 12 engages. The spacer 12 is axially supported against the radical step of the countersunk recess 18. The ring-shaped carrier member 10 is likewise provided, at its end surface adjacent to the spacer 12, with a countersunk circular recess 19 into which the spacer 12 likewise engages and is axially supported against the radical step of the countersunk recess 19 of the ring-shaped carrier member 10. As shown in FIG. 4, the ring-shaped carrier member 10 is spaced from the end surface 14 by a distance 20. Between the ring-shaped carrier of member 10 and the shank 6 of the tool 7, there is formed a clearance 21.

Each of the cutting regions 11 has a free surface 22, a chamfer surface 23, and a frontal surface 24. The chamfer surface 23 and the frontal surface 24 form, at the leading, in the rotational direction 25, end, additional cutting elements 26. In front of the cutting regions in the rotational direction 25, there is provided a chip guiding flute 27.

FIGS. 5 and 6 show two embodiments of the ring-shaped carrier member 10 with two cutting regions 11, in which additional cutting elements 26', 26" extend in a different way than the cutting element 26 in FIG. 2. In the embodiment of FIG. 5, the additional cutting elements 26' are formed as inclined chamfer cutting elements. In the embodiment of FIG. 6, the additional cutting elements 26" extend axially and are turned radially inward for cutting an outer profile of a projecting element of a workpiece.

Though the present invention was shown and described with references to the preferred embodiments, such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of various and/or alternative embodiments within the spirit and scope of the present invention as defined by the appended claims.

What is claimed is:

1. A chuck for securing a working tool in a machine-tool, comprising a receiving end region having a front end surface, a bore extending from the end surface for receiving a shank of the working tool, and a plurality of threaded holes arranged around the receiving bore; a one-piece, ring-shaped carrier member arranged outside of the end surface of the receiving end region and parallel thereto and provided with cutting regions formed integrally therewith and having cutting elements distributed circumferentially around the receiving bore of the receiving end region, the cutting regions extending transverse to a plane defined by the ring-shaped carrier member and projecting away therefrom; a plurality of retaining screws which extend through openings formed in the ring-shaped carrier member and are screwed into respective threaded holes formed in the receiving end region for attaching the ring-shaped carrier member to the receiving end region; and a spacer an axial height of which corresponds to a distance by which the ring-shaped carrier member is spaced from the cad surface of the receiving end region, and which is supported at its opposite axial ends against the end surface of the receiving end region and against the ring-shaped carrier member, respectively.

2. A chuck as set forth in claim 1, wherein the retaining screws extend axially with respect to the end surface of the receiving end region, and the threaded holes extend from the end surface of the receiving end region inward.

3. A chuck as set forth in claim 1, wherein the spacer is formed as a separate, from the ring-shaped carrier member, pail when the retained screws extend axially.

4. A chuck as set forth in claim 1, wherein the threaded holes formed in the receiving end region, the openings formed in the ring-shaped carrier, and the retaining screws provide for securing of the ring-shaped carrier member in different angular positions with respect to the receiving end region by rotating the ring-shaped carrier member about the receiving bore.

5. A chuck as set forth in claim 4, wherein the openings in the ring-shaped carrier member are formed as round bores, and wherein a number of threaded holes differ from a number of the round bores.

6. A chuck as set forth in claim 5, wherein the threaded holes are arranged in a form of a closed ring-ended sling, and the number of the threaded holes exceeds the number of round bores in several times by an integral multiple.

7. A chuck as set forth in claim 1, wherein at least one of the cutting regions has, at a side thereof adjacent to the receiving bore, an additional cutting element extending in a longitudinal direction of the receiving bore in a spaced relationship thereto.

8. A chuck as set forth in claim 1, wherein the cutting elements are formed as chamfer cutting elements.

9. A chuck as set forth in claim 1, wherein the cutting elements are formed as an outer profile cutting element.

* * * * *